US012580195B2

(12) United States Patent
Tokuoka et al.

(10) Patent No.: US 12,580,195 B2
(45) Date of Patent: Mar. 17, 2026

(54) LITHIUM-ION SECONDARY BATTERY

(71) Applicant: SAFT AMERICA, Cockeysville, MD (US)

(72) Inventors: Saori Tokuoka, Cockeysville, MD (US); Thomas Greszler, Cockeysville, MD (US); John Havranek, Cockeysville, MD (US); Jian Dong, Cockeysville, MD (US); Xilin Chen, Cockeysville, MD (US); Frank Cao, Cockeysville, MD (US)

(73) Assignee: SAFT AMERICA, Cockeysville, MD (US)

( * ) Notice: Subject to any disclaimer, the term of this patent is extended or adjusted under 35 U.S.C. 154(b) by 871 days.

(21) Appl. No.: 17/714,264

(22) Filed: Apr. 6, 2022

(65) Prior Publication Data

US 2023/0327111 A1      Oct. 12, 2023

(51) Int. Cl.
H01M 10/0569      (2010.01)
H01M 4/36          (2006.01)
(Continued)

(52) U.S. Cl.
CPC ........... H01M 4/587 (2013.01); H01M 4/364 (2013.01); H01M 4/525 (2013.01);
(Continued)

(58) Field of Classification Search
CPC .. H01M 4/587; H01M 4/525; H01M 10/0525; H01M 10/0565; H01M 10/0567;
(Continued)

(56) References Cited

U.S. PATENT DOCUMENTS 8,795,903 B2      8/2014   Smart et al.
8,920,981 B2      12/2014  Smart et al.
(Continued)

FOREIGN PATENT DOCUMENTS

CN          104409767 A      3/2015
EP          1 009 057 A1     6/2000
(Continued)

OTHER PUBLICATIONS

WO-2012127548-A1 Translation (Year: 2012).*
WO-2022055308-A1 Translation (Year: 2022).*

*Primary Examiner* — Matthew T Martin
*Assistant Examiner* — Kevin Song
(74) *Attorney, Agent, or Firm* — Sughrue Mion, PLLC

(57)          ABSTRACT

A lithium-ion secondary battery, including (A) an anode including an anode active material; (B) a cathode including a cathode active material; (C) a separator; and (D) an electrolytic solution, the anode active material including (a1) about 5.0 to about 45.0 wt % natural graphite particles, and (a2) about 95.0 to about 55.0 wt % artificial graphite particles; a size of both the natural and artificial graphite particles (a1), (a2) independently being about 2.0 $\mu$m<D50<about 7.0 $\mu$m; the electrolytic solution containing (d1) an organic solvent, (d2) a charge carrier, and (d3) one or more additive compounds for forming a solid electrolyte interphase ("SEI") on the anode; and the organic solvent (d1) including about 10.0 to about 95.0 vol % of a linear ester of a $C_2$ to $C_8$ saturated acid; and a total weight of the additive compounds (d3) being about 0.20 to about 6.0 wt %.

20 Claims, 4 Drawing Sheets

| Mixture/ Electrolyte additives amount | Calendar life at 60°C / capacity retention after 100 days(%) | | | | | |
|---|---|---|---|---|---|---|
| | VC 0wt% FEC 0wt% | VC 0.1wt% FEC 0.1wt% | VC 0.3wt% FEC 0.3wt% | VC 0.6wt% FEC 0.6wt% | VC 1.5wt% FEC1.5wt% | VC 3wt% FEC3wt% |
| 1 | | 63 | 65 | 70 | 74 | 75 |
| 2 | | 63 | 66 | 71 | 75 | 75 |
| 3 | | 64 | 67 | 72 | 76 | 76 |
| 4 | | 69 | 72 | 77 | 81 | 82 |
| 5 | | 74 | 77 | 82 | 86 | 87 |
| 6 | 69 | 79 | 82 | 87 | 91 | 91 |
| 7 | 74 | 84 | 87 | 92 | 92 | 93 |
| 8 | 75 | 85 | 88 | 93 | 93 | 93 |
| 9 | 79 | 88 | 94 | 94 | 94 | 95 |
| 10 | 85 | 95 | 95 | 95 | 95 | 95 |
| 11 | 86 | 96 | 96 | 96 | 96 | 96 |
| 12 | 87 | 97 | 97 | 97 | 97 | 97 |

(51) Int. Cl.
    *H01M 4/525*         (2010.01)
    *H01M 4/587*         (2010.01)
    *H01M 10/0525*      (2010.01)
    *H01M 10/0565*      (2010.01)
    *H01M 10/0567*      (2010.01)
    *H01M 4/02*          (2006.01)

(52) U.S. Cl.
    CPC ... *H01M 10/0525* (2013.01); *H01M 10/0565*
        (2013.01); *H01M 10/0567* (2013.01); *H01M*
        *10/0569* (2013.01); *H01M 2004/021* (2013.01);
        *H01M 2004/027* (2013.01); *H01M 2004/028*
        (2013.01); *H01M 2300/004* (2013.01); *H01M*
        *2300/0082* (2013.01)

(58) Field of Classification Search
    CPC ....... H01M 10/0569; H01M 2004/021; H01M
        2004/027; H01M 2004/028; H01M
        2300/004; H01M 2300/0082
    See application file for complete search history.

(56)           References Cited

U.S. PATENT DOCUMENTS

| | | | |
|---|---|---|---|
| 9,472,813 B2 | 10/2016 | Uzun et al. | |
| 9,947,960 B2 | 4/2018 | Hallac et al. | |
| 10,340,553 B2 | 7/2019 | Smart et al. | |
| 10,573,921 B2 | 2/2020 | Kil et al. | |

| | | | | |
|---|---|---|---|---|
| 2001/0019800 A1 | 9/2001 | Herreyre et al. | |
| 2006/0154116 A1 | 7/2006 | Siret et al. | |
| 2008/0305400 A1 | 12/2008 | Biensan et al. | |
| 2014/0186702 A1* | 7/2014 | Takahata | |
| 2015/0303521 A1* | 10/2015 | Sasaki ............... | H01M 10/0567 |
| | | | 429/326 |
| 2015/0318542 A1* | 11/2015 | Takeshi | |
| 2019/0190027 A1* | 6/2019 | Takeshita | |
| 2019/0260084 A1 | 8/2019 | Farmakis et al. | |
| 2020/0259215 A1* | 8/2020 | Park ...................... | H01M 4/587 |
| 2021/0167393 A1* | 6/2021 | Kuzuoka ............. | H01M 50/434 |
| 2021/0226251 A1* | 7/2021 | Ji ....................... | H01M 10/0569 |
| 2021/0249714 A1* | 8/2021 | Hayashi | |
| 2021/0265630 A1* | 8/2021 | Choi ..................... | H01M 4/364 |

FOREIGN PATENT DOCUMENTS

| | | | | |
|---|---|---|---|---|
| EP | 1 311 018 A1 | 5/2003 | | |
| EP | 1 675 209 A1 | 6/2006 | | |
| EP | 1 936 732 A1 | 6/2008 | | |
| EP | 2 262 047 A1 | 12/2010 | | |
| EP | 2 320 512 A1 | 5/2011 | | |
| EP | 2 160 787 B1 | 4/2014 | | |
| EP | 2 168 199 B1 | 3/2015 | | |
| JP | 2010-108943 A | 5/2010 | | |
| JP | 2010-192327 A | 9/2010 | | |
| KR | 20160073822 A | * 6/2016 | | |
| WO | WO-2012127548 A1 * | 9/2012 | ............ | H01M 4/621 |
| WO | WO-2022055308 A1 * | 3/2022 | ............ | H01M 4/366 |

\* cited by examiner

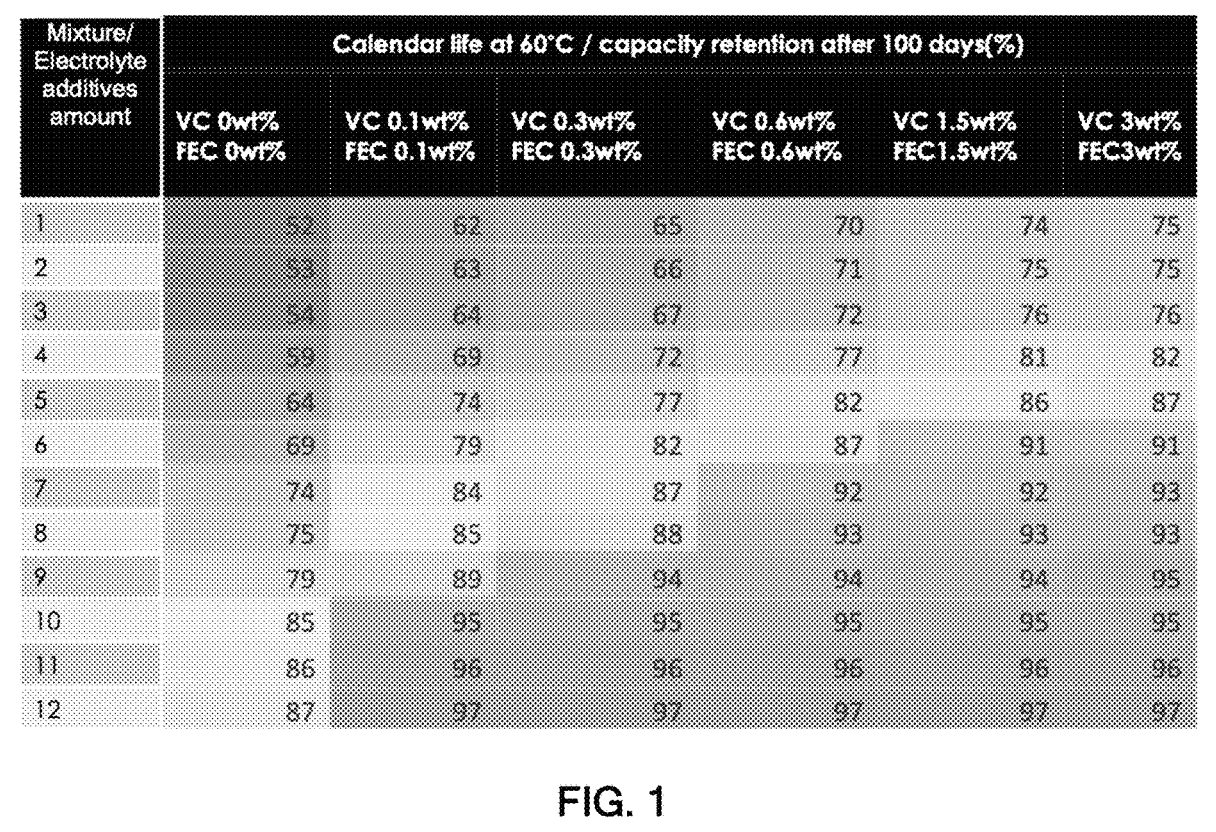

| Mixture/ Electrolyte additives amount | Calendar life at 60°C / capacity retention after 100 days(%) | | | | | |
| --- | --- | --- | --- | --- | --- | --- |
| | VC 0wt% FEC 0wt% | VC 0.1wt% FEC 0.1wt% | VC 0.3wt% FEC 0.3wt% | VC 0.6wt% FEC 0.6wt% | VC 1.5wt% FEC1.5wt% | VC 3wt% FEC3wt% |
| 1 | | 65 | 65 | 70 | 74 | 75 |
| 2 | | 63 | 66 | 71 | 75 | 75 |
| 3 | | 64 | 67 | 72 | 76 | 76 |
| 4 | | 69 | 72 | 77 | 81 | 82 |
| 5 | 64 | 74 | 77 | 82 | 86 | 87 |
| 6 | 69 | 79 | 82 | 87 | 91 | 91 |
| 7 | 74 | 84 | 87 | 92 | 92 | 93 |
| 8 | 75 | 85 | 88 | 93 | 93 | 93 |
| 9 | 79 | 89 | 94 | 94 | 94 | 95 |
| 10 | 85 | 95 | 95 | 95 | 95 | 95 |
| 11 | 86 | 96 | 96 | 96 | 96 | 96 |
| 12 | 87 | 97 | 97 | 97 | 97 | 97 |

FIG. 1

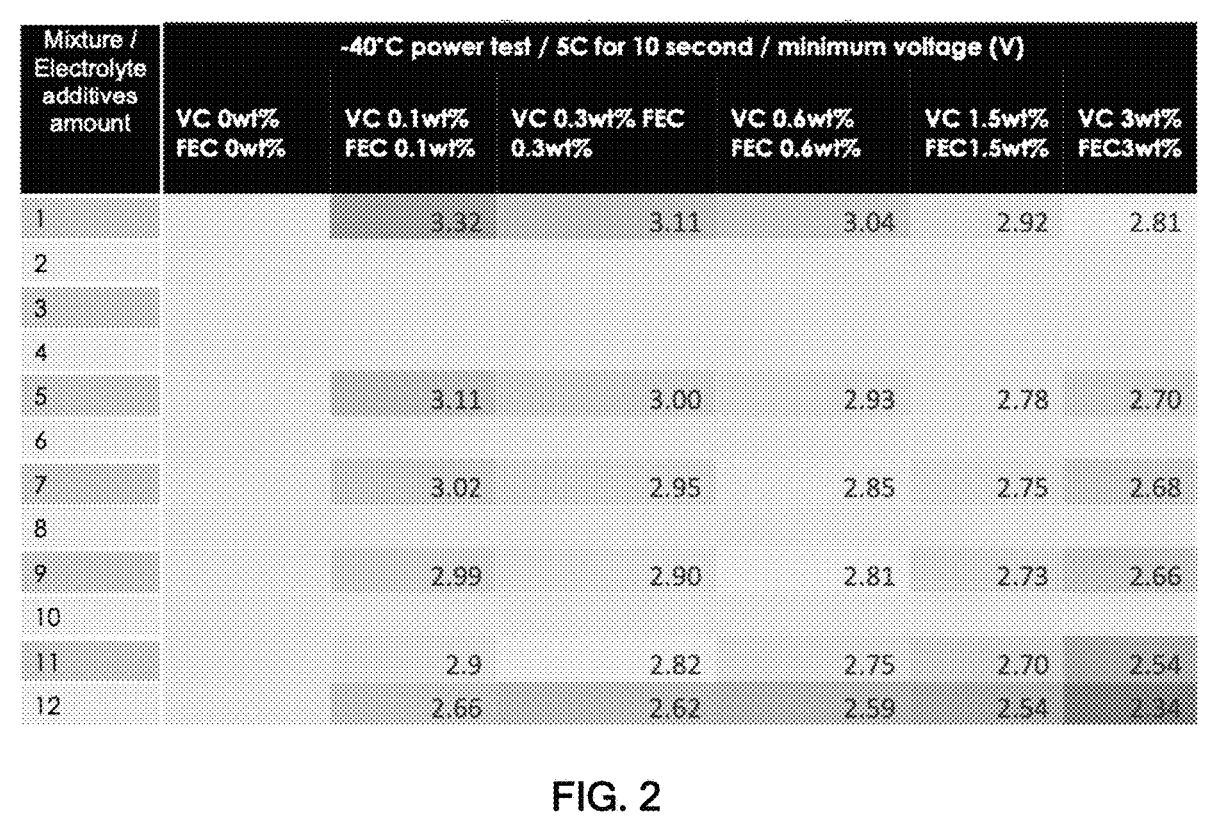

| Mixture / Electrolyte additives amount | -40°C power test / 5C for 10 second / minimum voltage (V) | | | | | |
|---|---|---|---|---|---|---|
| | VC 0wt% FEC 0wt% | VC 0.1wt% FEC 0.1wt% | VC 0.3wt% FEC 0.3wt% | VC 0.6wt% FEC 0.6wt% | VC 1.5wt% FEC1.5wt% | VC 3wt% FEC3wt% |
| 1 | | 3.32 | 3.11 | 3.04 | 2.92 | 2.81 |
| 2 | | | | | | |
| 3 | | | | | | |
| 4 | | | | | | |
| 5 | | 3.11 | 3.00 | 2.93 | 2.78 | 2.70 |
| 6 | | | | | | |
| 7 | | 3.02 | 2.95 | 2.85 | 2.75 | 2.68 |
| 8 | | | | | | |
| 9 | | 2.99 | 2.90 | 2.81 | 2.73 | 2.66 |
| 10 | | | | | | |
| 11 | | 2.9 | 2.82 | 2.75 | 2.70 | 2.54 |
| 12 | | 2.66 | 2.62 | 2.59 | 2.54 | |

FIG. 2

LITHIUM-ION SECONDARY BATTERY

BACKGROUND

Technical Field

The present disclosure relates, for example, to a lithium-ion secondary battery that may provide both a high temperature (e.g., about 60° C.) calendar life and a high power performance at low temperature (e.g., about –40° C.).

Description of Related Art

A conventional lithium-ion secondary battery may use small particle sized anode materials, and a typical type of material is natural graphite. Also, a typical solvent for conventional lithium-ion secondary batteries is a combination of a cyclic carbonate and a linear carbonate. However, a drawback of these conventional cell designs is that the ionic conductivity of cyclic carbonates at low temperate is low, such that these conventional electrolytes cannot be used for cold climate applications at around –40° C.

U.S. Patent Publication No. 20200259215 describes a multicomponent electrolyte with a combination of three different groups of chemicals for the solvent; namely, a cyclic carbonate, a linear carbonate, and an ester. Due to the high volatility and mobility of the ester portion (e.g., ethyl acetate, methyl propionate, ethyl propionate, or methyl butyrate) at low temperature, the electrolyte of the US '215 publication provides improved low temperature conductivity compared to a conventional electrolyte.

However, it was found that, when natural graphite is used an anode active material in combination with an ester solvent, the stability of the electrolyte at high temperature (about 60° C.) is not satisfactory. Without being bound by any theory, this is due to reactions between the edge planes of natural graphite and the highly reactive electrolyte, especially esters, which are more reactive than conventional carbonates at high temperature. Accordingly, there remained a need for a lithium-ion secondary battery having a combination of high power at low temperature (about –40° C.) and high stability/calendar life when stored at a high temperature (about 60° C.) (e.g., no degradation of the electrolyte during storage).

SUMMARY OF THE DISCLOSURE

Aspects of certain embodiments of the present disclosure overcome the above disadvantages and/or other disadvantages not described above. However, aspects of the embodiments are not required to overcome the disadvantages described above, and aspects of the embodiments may not overcome any of the disadvantages described above.

The present disclosure provides, for example, a lithium-ion secondary battery having an anode active material (also known as a negative electrode active material) including a blend of natural graphite particles and artificial graphite particles. The lithium-ion secondary battery of the present disclosure may also include, for example, an electrolytic solution containing one or more additives for forming a solid electrolyte interphase ("SEI") on the anode active material. The lithium-ion secondary battery of the present disclosure may also include, for example, a solvent containing a linear ester.

In one example embodiment, the present disclosure provides a lithium-ion secondary battery, including:

(A) an anode including an anode active material;
(B) a cathode including a cathode active material;
(C) a separator disposed between the anode and cathode; and
(D) an electrolytic solution,
the anode active material including (a1) about 5.0 to about 45.0 wt % natural graphite particles, and (a2) about 95.0 to about 55.0 wt % artificial graphite particles when a total weight of the anode active material is 100 wt %;
a volume average particle size of the natural graphite particles (a1) being about 2.0 $\mu$m<D50<about 7.0 $\mu$m, and a volume average particle size of the artificial graphite particles (a2) being about 2.0 $\mu$m<D50<about 7.0 $\mu$m;
the electrolytic solution containing (d1) an organic solvent, (d2) a charge carrier, and (d3) one or more additive compounds for forming a solid electrolyte interphase ("SEI") on the anode active material; and
the organic solvent (d1) including about 5.0 to about 95.0 vol % of a linear ester of a $C_2$ to $C_8$ saturated acid when a total volume of the organic solvent is 100 vol %; and
a total weight of the one or more additive compounds (d3) being about 0.20 to about 6.0 wt % when a total weight of the electrolytic solution is 100 wt %.

The lithium-ion secondary battery of the present disclosure can provide, for example, a combination of high temperature (e.g., 60° C.) calendar life and high power performance at low temperature (e.g., –40° C.).

In some embodiments, the one or more additive compounds (d3) may be, for example, one or more of vinylene carbonate, vinyl ethylene carbonate, allyl ethyl carbonate, vinyl acetate, divinyl adipate, acrylic acid nitrile, 2-vinyl pyridine, maleic anhydride, methyl cinnamate, phosphonate, vinyl-containing silane-based compounds, vinyl containing siloxanes, acrylic acid nitrile, 2-cyanofurane, $SO_2$, $CS_2$, polysulfide, alkyl sulfites, aryl sulfites, propane sultone, butane sultone, furan derivatives, $N_2O$, alkylnitrates, alkylnitrites, alpha-bromo-gamma-butyrolactone, methyl-chloroformate, or fluoro-ethylene carbonate.

In some embodiments, the one or more additive compounds (d3) may be, for example, one or more of dialkyl pyrocarbonate, $Li_2CO_3$, phenyl esters, aromatic esters, anhydrides, maleic anhydride, succinimide, aromatic isocyantes, $B_2O_3$, organic borates, trialkylboroxines, trialkoxyboroxines, LiBOB, $LiPO_2F_2$, lithium oxalyldifluoroborate ("LiODFB"), halogenated compounds, or polydimethylsiloxane.

In some embodiments, the one or more additive compounds (d3) may be, for example, one or more of tris (pentafluorophenyl) borane, $NaClO_4$, $Na_2CO_3$, $K_2CO_3$, or crown ethers.

In some embodiments, each additive compound (d3) may be contained in the electrolyte in an amount, for example, of about 0.10 to about 3.0 wt %, or a total amount of the one or more additive compounds (d3) may be about 0.20 to about 6.0 wt %.

In one example embodiment, the one or more additive compounds (d3) includes, for example, about 0.1 to about 3 wt % vinylene carbonate ("VC"), and about 0.10 to about 3.0 wt % fluoroethylene carbonate ("FEC"). In some embodiments, a total amount of the VC and FEC is about 0.20 to about 6.0 wt %.

In some embodiments, the organic solvent (d1) may include, for example, about 5.0 vol % to about 55.0 vol % of the ester, or may include, for example, about 10.0 vol % to about 35.0 vol % ester.

In some embodiments, the organic solvent (d1) may further include, for example, about 2.5 vol % to about 75.0 vol % of one or more cyclic carbonate compounds and, for example, about 2.5 vol % to about 75.0 vol % of one or more linear carbonate compounds.

In some embodiments, the solvent (d1) may include, for example, about 5.0 vol % to about 95.0 vol % of one or more cyclic carbonate compounds and/or one or more linear carbonate compounds.

In some embodiments, the organic solvent (d1) may further include, for example, one or more saturated cyclic carbonates, unsaturated cyclic carbonates, linear carbonates, ethers, lactones, tetrahydrothiophene bioxide, or nitriles.

In some embodiments, the organic solvent (d1) may further include, for example, one or more of ethylene carbonate ("EC"), propylene carbonate ("PC"), butylene carbonate ("BC"), dimethyl carbonate ("DMC"), diethyl carbonate ("DEC"), ethyl methyl carbonate ("EMC"), dipropyl carbonate ("DPC"), dimethyl ether ("DME"), 1,2-dimethoxyethane ("DMOE"), 1,1,2,2-Tetrafluoroethyl-2,2,3,3-Tetrafluoropropylether ("TTE"), or diethyl ether ("DEE").

In some embodiments, the linear ester of the organic solvent (d1) may be, for example, one or more of ethyl acetate, methyl acetate, propyl acetate, ethyl butyrate, methyl butyrate, propyl butyrate, ethyl propionate, methyl propionate, or propyl propionate.

In some embodiments, the cathode active material (b1) may be represented, for example, by one of the following Formulas (A) to (E) or may be a blend thereof:

$$Li_{1+x}M1_aX_bPO_4 \qquad \text{Formula (A),}$$

wherein, in Formula (A), M1 is Fe, Mn, and/or Co; X is Ni, V, Y, Mg, Ca, Ba, Al, Sc, and/or Nd; $0 \leq x \leq 0.15$; $a > 0$; $b \leq 0$; and optionally $a+b=1$, $$Li_{1+x}Ni_aM2_dM3_eO_2 \qquad \text{Formula (B),}$$

wherein, in Formula (B), M2 is Co, Al, and/or Mn; M3 is B, Mg, Si, Ca, Ti, V, Cr, Mn, Fe, Cu, Zn, Y, Zr, Nb, W, Mo, Sr, Ce, Ga, and/or Ta; $0 \leq x \leq 0.15$; $a > 0$; $d > 0$; $e \geq 0$; and optionally $a+d+e=1$, $$Li_{1+x}Mn_2O_4 \qquad \text{Formula (C),}$$

wherein, in Formula (C), $0 \leq x \leq 0.15$, $$Li_{1+x}CoO_2 \qquad \text{Formula (D),}$$

wherein, in Formula (D), $0 \leq x \leq 0.15$, $$Li_{1+x}V_{1-y}M_yPO_4F_z \qquad \text{Formula (E),}$$

wherein, in Formula (E), $0 < x \leq 1$; $0 \leq y \leq 0.5$; $0.8 \leq z \leq 1.2$; and M is Ti, Al, Mg, Mn, Fe, Co, Y, Cr, Cu, Ni, and/or Zr.

In some embodiments, the anode active material may include only the natural graphite particles (a1) and the artificial graphite particles (a2). That is, in some embodiments, the anode active material may consist of the natural graphite particles (a1) and the artificial graphite particles (a2).

In some embodiments, the anode active material may further include an additional anode active material other than the natural graphite particles (a1) and the artificial graphite particles (a2). When included, the additional anode active material may be, for example, one or more of coke, Si, Sn, SiOx, or lithium metal. In some embodiments, a total weight of the natural graphite (a1) and the artificial graphite (a2) is about 75.0 to about 100 wt % when a total weight of the anode active material is considered to be 100 wt %.

In some embodiments, the anode (A) may further include, for example, a conductive additive and/or a binder.

In some embodiments, a total weight of the natural graphite (a1) and the artificial graphite (a2) may be, for example, about 75.0 to about 99.0 wt % when a total weight of a material making up the anode (A) is considered to be 100 wt % (here, the "material making up the anode" means the anode material layer disposed on an anode current collector; that is, the total weight does not include the weight of the collector).

In one example embodiment, the lithium-ion secondary battery of the present disclosure may include, for example, about 0.10 to about 3.0 wt % vinylene carbonate (VC) and about 0.10 to about 3.0 wt % fluoroethylene carbonate (FEC); one or more cyclic carbonate compounds and one or more linear carbonate compounds; and a linear ester selected from ethyl acetate, methyl acetate, propyl acetate, ethyl butyrate, methyl butyrate, propyl butyrate, ethyl propionate, methyl propionate, or propyl propionate.

In some embodiments, a BET specific surface area of the natural graphite (a1) may be, for example, about 10.0 to about 20.0 $m^2/g$. In some specific embodiments, the BET specific surface area of the natural graphite (a1) may be about 12.0 to about 18.0 $m^2/g$.

In some embodiments, a BET specific surface area of the artificial graphite (a2) may be, for example, about 1.0 to about 8.0 $m^2/g$. In some specific embodiments, the BET specific surface area of the artificial graphite (a2) may be about 2.5 to about 5.5 $m^2/g$.

Additional features and advantages of the present disclosure are described further below. This summary section is meant merely to illustrate certain features of the disclosure, and is not meant to limit the scope of the disclosure in any way. The failure to discuss a specific feature or embodiment of the disclosure, or the inclusion of one or more features in this summary section, should not be construed to limit the claims.

BRIEF DESCRIPTION OF THE FIGURES

Any figures contained herein are provided only by way of example and not by way of limitation.

FIG. 1 is a table showing the results of Example 1, which includes a calendar life test at high temperature (60° C.) showing capacity retention after 100 days.

FIG. 2 is a table showing the results of Example 2, which includes a low temperature (−40° C.) power test showing minimum voltage.

DETAILED DESCRIPTION OF EMBODIMENTS OF THE DISCLOSURE

Figure 3:
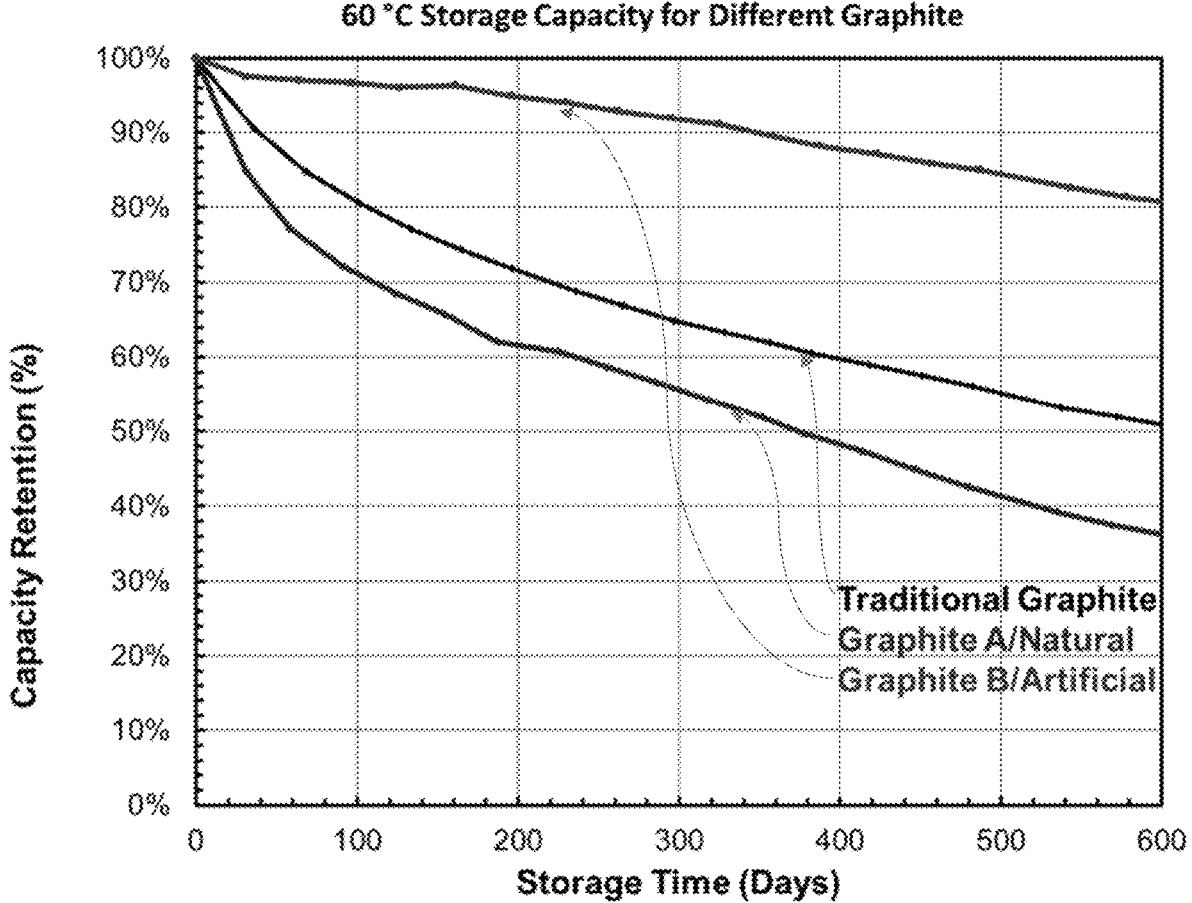
FIG. 3 is a chart showing the results of Reference Example 1, which includes a long term storage capacity test (600 days).

It is to be understood that both the foregoing general description and the following detailed description are exemplary and are intended to provide further explanation of the claims. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Any range will be understood to encompass and be a disclosure of each discrete point and subrange within the range. Stated differently, the ranges in the present disclosure are equivalent to a subset of the unwieldy and lengthy description of every possible combination of these discrete values, presented in an easily understood shorthand format (i.e., a range). Even when there is a disclosure herein of both a broad range and a narrower range within the broad range, the broad range should still be understood as corresponding to a disclosure of each discrete point and subrange within the range.

Unless defined otherwise, all technical and scientific terms used herein have the same meaning as commonly understood by one of ordinary skill in the art to which this disclosure belongs. Any methods and materials similar or equivalent to those described herein may be used in the practice or testing of the disclosure, as it will be understood that modifications and variations are encompassed within the spirit and scope of the instant disclosure.

As used herein, "about," "approximately," "substantially," and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of particular term, and "substantially" and "significantly" will mean plus or minus >10% of the particular term. "Comprising" and "consisting essentially of" have their customary meaning in the art Anode (A)

The structure of the anode (A) is not particularly limited. The anode may include at least the anode active material (i.e., the combination of the natural graphite (a1) and the artificial graphite (a2)) on a current collector, and may include one or more binder materials (a3) and/or conductive materials (a4).

<Anode Active Material>

The anode active material contains at least the combination of 5.0 to 45.0 wt % of the natural graphite (a1) and 95.0 to 55.0 wt % of the artificial graphite (a2) when a total weight of the anode active material is 100 wt %. The natural graphite and artificial graphite can be separately obtained and then blended to achieve a weight ratio within a range described herein.

It is well known that graphite comes in two main forms: natural graphite, which is mined, and synthetic graphite, which may be produced from, for example, petroleum coke or coal tar. Because of the different manners in which natural graphite and artificial graphite are produced, these two forms of graphite have a resulting difference in physical structure/properties, such as a difference in the number of broken edges versus hexagonal edges. The difference in structure between these two types of graphite can result in different properties within the battery chemistry. For example, while a high number of broken edges may help with increasing the power of the battery, the broken edges may be more reactive with the solvent.

The content of the natural graphite (a1) may be, for example, 10.0 wt % or more, 15.0 wt % or more, 20.0 wt % or more, 25.0 wt % or more, 30.0 wt % or more, 35.0 wt % or more, or 40.0 wt % or more, and may be, for example, 40.0 wt % or less, 35.0 wt % or less, 30.0 wt % or less, 25.0 wt % or less, 20.0 wt % or less, 15.0 wt % or less, or 10.0 wt % or less.

The content of the artificial graphite (a2) may be, for example, 55.0 wt % or more, 60.0 wt % or more, 65.0 wt % or more, 70.0 wt % or more, 75.0 wt % or more, 80.0 wt % or more, 85.0 wt % or more, or 90.0 wt % or more, and may be, for example, 90.0 wt % or less, 85.0 wt % or less, 80.0 wt % or less, 75.0 wt % or less, 70.0 wt % or less, 65.0 wt % or less, or 60.0 wt % or less.

<Natural Graphite>

Natural graphite is well known in the art and it is not particularly limited herein, except that the natural graphite (a1) for use in the present disclosure has a volume average particle size of 2.0 μm<D50<7.0 μm.

A BET specific surface area of the natural graphite may be, for example, about 10.0 to about 20.0 m$^2$/g, or may be about 12.0 to about 18.0 m$^2$/g. The high surface area of natural graphite results in a high number of exposed edges, which can be very reactive with solvents (especially esters) in the electrolytic solution at high temperature (including during high temperature storage).

<Artificial Graphite>

Artificial graphite is well known in the art and it is not particularly limited herein, except that the artificial graphite (a2) for use in the present disclosure has a volume average particle size of 2.0 μm<D50<7.0 μm.

A BET specific surface area of the artificial graphite may be, for example, about 1.0 to about 8.0 m$^2$/g, or may be about 2.5 to about 5.5 m$^2$/g.

The particle size of the natural graphite may be the same as the artificial graphite, may be larger than artificial graphite, or may be smaller than the artificial graphite. The difference in D50 particle size between the natural graphite and the artificial graphite may be, for example, about +/−4.5 μm, may be about +/−2.5 μm, may be about +/−1.5 μm, or may be about +/−0.5 μm.

The anode active material may, for example, contain only the natural graphite and artificial graphite as the anode active material (that is, the anode active material may not, for example, contain any other known anode active material). However, the anode active material may additionally contain one or more selected from the group consisting of graphite, coke, Si, Sn, or SiOx. In this regard, when an anode active material other than artificial graphite and natural graphite is included in the anode active material, a total weight of the artificial graphite and the natural graphite is 75.0 wt % to 99.0 wt % when a total weight of the anode active material is 100 wt %. Stated different the total of (a1)+(a2) may be 80.0 wt % or more, 85.0 wt % or more, 90.0 wt % or more, 95.0 wt % or more, or higher of the total anode active material.

<Anode Current Collector>

The current collector for the anode is not particularly limited and known materials and designs may be used. In some embodiments, the current collector may be, for example, a two-dimensional conducting support such as a solid or perforated sheet, based on carbon or metal, for example copper foil, or carbon coated copper foil.

<Anode Binder Material (a3)>

The use of an anode binder material is not particularly limited and known materials for this function can be used. In some embodiments, the binder material may contain, for example, one or more of the following components: polyvinylidene fluoride (PVdF) and its copolymers, polytetrafluoroethylene (PTFE), polyacrylonitrile (PAN), polymethyl or polybutyl methacrylate, polyvinyl chloride (PVC), polyvinylformal, polyesters and amide block polyethers, polymers of acrylic acid, methylacrylic acid, acrylamide, itaconic acid, sulfonic acid, and their derivatives with lithium salt elastomers and cellulose compounds.

Among the elastomers which may be used, mention may be made of ethylene/propylene/diene terpolymers (EPDM), styrene/butadiene copolymers (SBR), acrylonitrile/butadiene copolymers (NBR), styrene/butadiene/styrene block copolymers (SBS) or styrene/acrylonitrile/styrene block copolymers (SIS), styrene/ethylene/butylene/styrene copolymers (SEBS), styrene/butadiene/vinylpyridine terpolymers (SBVR), polyurethanes (PU), neoprenes, polyisobutylenes (PIB), butyl rubbers and mixtures thereof.

The cellulose compound may be, for example, a carboxymethylcellulose (CMC), a hydroxypropylmethylcellulose (HPMC), a hydroxypropylcellulose (HPC), a hydroxyethylcellulose (HEC) or other cellulose derivative.

<Anode Conductive Material (a4)>

The use of an anode conductive material is not particularly limited and any known conductive material can be used. In some embodiments, the conductive material may be, for example, one or more of carbon black, acetylene black (AB), carbon nanotubes (CNT), carbon fiber (CF), graphene, graphene oxide (GO), soot or one of a mixture thereof.

Methods of making anodes are well known. In some embodiments, the anode active material may, for example, be combined with a binder material and/or a conductive material and applied to a current collector by a known method. In some embodiments, granules including the anode material could be formed and pressed to the anode current collector by a known method, or a slurry including the anode material and a solvent could be coated on the anode current collector and then dried by a known method.

The amounts of a binder, conductive material, and other additives for use in the anode are not particularly limited, and suitable ratios are well known in the art. When included, the amount of the conductive material may be, for example, from greater than about 0 wt % to about 20.0 wt % (or any amount within this range, e.g., about 0.5 wt % to about 10.0 wt %, or about 1.0 wt % to about 5.0 wt %). When included, the amount of the binder or binders may be, for example, from about 1.0 wt % to about 20.0 wt % (or any amount within this range, e.g., about 1.0 wt % to about 7.0 wt %), when a total weight of the positive electrode material is considered 100 wt %.

Cathode (B)

The structure of the cathode is not particularly limited. The cathode may include at least the cathode active material (b1) on a current collector, and may include one or more binder materials (b2) and/or conductive materials (b3).

<Active Materials (b1)>

The cathode active material is not particularly limited, and may be, for example, one of the following well-known materials: NCA, NMC, LFP, LMP, optionally-doped LFMP, LCP, LCO, LNO, LMO, LNMO, LVPF, or a blend thereof.

The cathode active material may be represented, for example, by one or more of the following Formulae (A) to (E) defined below.

<Formula (A) (e.g., LFP, LMP, LCP, and Optionally-Doped LFMP)>

The cathode active material may be represented by the following Formula (A):

$$Li_{1+x}M1_aX_bPO_4 \qquad \text{Formula (A)},$$

wherein, in Formula (A), M1 is Fe, Mn, or Co; X is at least one of Ni, V, Y, Mg, Ca, Ba, Al, Sc, or Nd; $0 \leq x \leq 0.15$; $a>0$; $b \leq 0$; and optionally $a+b=1$, More specifically, the cathode active material according to the Formula (A) may be one of the following Formula (A1) (also referred to as "LFP"), Formula (A2) (also referred to as "LMP"), Formula (A3) (also referred to as "LCP") or Formula (A4) (also referred to as "LFMP" or "optionally-doped LFMP") or a blend thereof:

$$Li_{1+x}FePO_4 \qquad \text{Formula (A1) (LFP)},$$

wherein, in Formula (A1), $0 \leq x \leq 0.15$;

$$Li_{1+x}MnPO_4 \qquad \text{Formula (A2) (LMP)},$$

wherein, in Formula (A2), $0 \leq x \leq 0.15$;

$$Li_{1+x}CoPO_4 \qquad \text{Formula (A3) (LCP)},$$

wherein, in Formula (A3), $0 \leq x \leq 0.15$;

$$Li_{1+x}Fe_yMn_zX_bPO_4 \qquad \text{Formula (A4) (LFMP)},$$

wherein, in Formula (A4), X is at least one of Ni, V, Y, Mg, Ca, Ba, Al, Sc, or Nd; $0 \leq x \leq 0.15$; $y>0$; $z>0$; $b \geq 0$; and optionally $y+z+b=1$.

<Formula (B) (e.g., NMC, LNMO, NCA, and NMCA)>

The cathode active material may be represented by the following Formula (B):

$$Li_{1+x}Ni_aM2_dM3_eO_2 \qquad \text{Formula (B)},$$

wherein, in Formula (B), M2 is Co, Al, and/or Mn; M3 is B, Mg, Si, Ca, Ti, V, Cr, Mn, Fe, Cu, Zn, Y, Zr, Nb, W, Mo, Sr, Ce, Ga, and/or Ta; $0 \leq x \leq 0.15$; $a>0$; $d>0$; $e \geq 0$; and optionally $a+d+e=1$, More specifically, the cathode active material according to the Formula (B) may be one of the following Formula (B1) (also referred to as "NMC"), Formula (B2) (also referred to as "LNMO"), Formula (B3) (also referred to as "NCA") or Formula (B4) (also referred to as "NMCA") or a blend thereof:

$$Li_w(Ni_xMn_yCo_zM_t)O_2 \qquad \text{Formula (B1)(NMC)},$$

wherein, in Formula (B1), $0.9 \leq w \leq 1.1$; $x>0$; $y>0$; $z>0$; $t \geq 0$; M is at least one of Al, B, Mg, Si, Ca, Ti, V, Cr, Fe, Cu, Zn, Y, Zr, Nb, W, Mo, Sr, Ce, Ga, or Ta; and optionally $x+y+z+t=1$;

$$Li_{1+x}Ni_aMn_bO_2 \qquad \text{Formula (B2) (LNMO)},$$

wherein, in Formula (B2), $0 \leq x \leq 0.15$; $a>0$; $b>0$; and optionally $a+b=1$;

$$Li\ Li_w(Ni_xCo_yAl_zM_t)O_2 \qquad \text{Formula (B3) (NCA)},$$

wherein, in Formula (B3), $0.9 \leq w \leq 1.1$; $x>0$; $y>0$; $z>0$; $t \geq 0$; M is at least one of B, Mg, Si, Ca, Ti, V, Cr, Mn, Fe, Cu, Zn, Y, Zr, Nb, W, Mo, Sr, Ce, Ga, or Ta; and optionally $x+y+z+t=1$;

$$Li_{1+x}Ni_aMn_bCo_cAl_dO_2 \qquad \text{Formula (B4) (NMCA)},$$

wherein, in Formula (B4), $0 \leq x \leq 0.15$; $a>0$; $b>0$; $c>0$; $d>0$; and optionally $a+b+c+d=1$.

Specific examples of Formula (B1) (NMC) include, for example, $LiNi_{0.33}Mn_{0.33}Co_{0.33}O_2$ (NMC 111), $LiNi_{0.5}Mn_{0.3}Co_{0.2}O_2$ (NMC 532), $LiNi_{0.6}Mn_{0.2}Co_{0.2}O_2$ (NMC 622), or $LiNi_{0.8}Mn_{0.1}Co_{0.1}O_2$ (NMC 811).

<Formula (C) (LMO)>

The cathode active material may be represented by the following Formula (C) (also referred to as "LMO"):

$$Li_{1+x}Mn_2O_4 \qquad \text{Formula (C) (LMO)},$$

wherein, in Formula (C), $0 \leq x \leq 0.15$.

<Formula (D) (LCO)>

The cathode active material may be represented by the following Formula (D) (also referred to as "LCO"):

$$Li_{1+x}CoO_2 \qquad\qquad \text{Formula (D),}$$

wherein, in Formula (D), $0 \leq x \leq 0.15$.

<Formula (E) (LVPF)>

The cathode active material may be represented by the following Formula (E) (also referred to as "LVPF"):

$$Li_{1+x}V_{1-y}M_yPO_4F_z \qquad\qquad \text{Formula (E),}$$

wherein, in Formula (E), $0 < x \leq 1$; $0 \leq y \leq 0.5$; $0.8 \leq z \leq 1.2$; and M is at least one of Ti, Al, Mg, Mn, Fe, Co, Y, Cr, Cu, Ni, or Zr.

<Cathode Current Collector>

A current collector for the cathode is not particularly limited and known materials and designs may be used, including the same examples described above for the anode current collector.

<Cathode Binder Material (b2)>

A binder material for the cathode is not particularly limited and known materials for this function can be used, and the same example materials named above for anode binder material.

<Cathode Conductive Material (b3)>

The cathode conductive material is not particularly limited and any known conductive material can be used, including the same example materials named above for the anode conductive material, except that graphite is an additional option for the cathode conductive material (graphite is not, for example, named as an optional anode conductive material since graphite is the primary anode active material of the lithium-ion secondary battery of the present disclosure).

Method of making cathodes are well known and are not particularly limited here, and may be an example method described above for the anode.

The amounts of a binder, conductive material, and other additives in the cathode are not particularly limited, suitable ratios are well known in the art, and example ratios are described above for the anode.

Separator (C)

The use of a separator is not particularly limited and known separators for secondary batteries can be used. Separators are placed between both electrodes, and typically is not electronically conductive but with mechanical and thermal stability.

Conventional categories of separators include, for example, microporous membranes, nonwoven membranes, electrospun membranes, membranes with external surface modification, composite membranes, and polymer blends. In one embodiment, the separator is a microporous membrane made of a polyolefin-based material, such as, for example, a microporous membrane made of polyethylene (PE), polypropylene (PP) or the like. The separator may also be, for example, coated with ceramic, such as ceramic coated PE or a ceramic coated trilayer structure.

Electrolytic Solution (D)

The electrolytic solution (D) contains at least the organic solvent (d1), the charge carrier (d2); and the one or more additive compounds (d3) for forming a solid electrolyte interphase (SEI) on the anode active material.

<Solvent (d1)>

The organic solvent (d1) contains about 5.0 vol % to about 95.0 vol % of a linear ester of a $C_2$ to $C_8$ saturated acid when a total volume of the organic solvent is 100 vol %. The linear ester may be one linear ester of a $C_2$ to $C_8$ saturated acid or a blend of two or more such linear esters. A content of the linear ester may be, for example, 10.0 vol % or higher, 15.0 vol % or higher, 20.0 vol % or higher, 25.0 vol % or higher, 30.0 vol % or higher, 35.0 vol % or higher, 40.0 vol % or higher, 45.0 vol % or higher, 50.0 vol % or higher, 55.0 vol % or higher, 60.0 vol % or higher, 65.0 vol % or higher, 70.0 vol % or higher, 75.0 vol % or higher, 80.0 vol % or higher, 85.0 vol % or higher, or 90.0 vol % or higher, and may be, for example, 90.0 vol % or lower, 85.0 vol % or lower, 80.0 vol % or lower, 75.0 vol % or lower, 70.0 vol % or lower, 65.0 vol % or lower, 60.0 vol % or lower, 55.0 vol % or lower, 50.0 vol % or lower, 45.0 vol % or lower, 40.0 vol % or lower, 35.0 vol % or lower, 30.0 vol % or lower, 25.0 vol % or lower, 20.0 vol % or lower, 15.0 vol % or lower, or 10.0 vol % or lower.

The linear ester may be, for example, one or more of ethyl acetate, methyl acetate, propyl acetate, ethyl butyrate, methyl butyrate, propyl butyrate, ethyl propionate, methyl propionate, or propyl propionate.

The linear ester and its content may, for example, be specifically selected for the purpose of allowing the battery of the present disclosure to operate at low temperature. In this regard, U.S. Patent Publication No. 20060154116 and U.S. Patent Publication No. 20200259215 describe electrolytic solutions for low temperature operation of lithium-ion secondary batteries and in this respect are incorporated herein by reference in their respective entireties.

The solvent (d1) also includes about 5.0 vol % to about 95.0 vol % of one or more cyclic carbonate compounds and/or one or more linear carbonate compounds. More specifically, the organic solvent (d1) may further include about 2.5 vol % to about 75.0 vol % of one or more cyclic carbonate compounds and about 2.5 vol % to about 75.0 vol % of one or more linear carbonate compounds.

The one or more cyclic carbonate compounds and/or one or more linear carbonate compounds may be referred to in combination as the carbonate solvent. In some embodiments, a content of the carbonate solvent may be, for example, 10.0 vol % or higher, 15.0 vol % or higher, 20.0 vol % or higher, 25.0 vol % or higher, 30.0 vol % or higher, 35.0 vol % or higher, 40.0 vol % or higher, 45.0 vol % or higher, 50.0 vol % or higher, 55.0 vol % or higher, 60.0 vol % or higher, 65.0 vol % or higher, 70.0 vol % or higher, 75.0 vol % or higher, 80.0 vol % or higher, or 85.0 vol % or higher, and may be, for example, 85.0 vol % or lower, 80.0 vol % or lower, 75.0 vol % or lower, 70.0 vol % or lower, 65.0 vol % or lower, 60.0 vol % or lower, 55.0 vol % or lower, 50.0 vol % or lower, 45.0 vol % or lower, 40.0 vol % or lower, 35.0 vol % or lower, 30.0 vol % or lower, 25.0 vol % or lower, 20.0 vol % or lower, 15.0 vol % or lower, or 10.0 vol % or lower.

The one or more cyclic carbonate compounds may be included in a total amount of, for example, 5.0 vol % or higher, 10.0 vol % or higher, 15.0 vol % or higher, 20.0 vol % or higher, 25.0 vol % or higher, 30.0 vol % or higher, 35.0 vol % or higher, 40.0 vol % or higher, 45.0 vol % or higher, 50.0 vol % or higher, 55.0 vol % or higher, 60.0 vol % or higher, 65.0 vol % or higher, or 70.0 vol % or higher, or may be included in a total amount of, for example, 70.0 vol % or lower, 65.0 vol % or lower, 60.0 vol % or lower, 55.0 vol % or lower, 50.0 vol % or lower, 45.0 vol % or lower, 40.0 vol % or lower, 35.0 vol % or lower, 30.0 vol % or lower, 25.0 vol % or lower, 20.0 vol % or lower, 15.0 vol % or lower, 10.0 vol % or lower, or 5.0 vol % or lower.

The one or more linear carbonate compounds may be included in a total amount of, for example, 5.0 vol % or higher, 10.0 vol % or higher, 15.0 vol % or higher, 20.0 vol % or higher, 25.0 vol % or higher, 30.0 vol % or higher, 35.0 vol % or higher, 40.0 vol % or higher, 45.0 vol % or higher, 50.0 vol % or higher, 55.0 vol % or higher, 60.0 vol % or higher, 65.0 vol % or higher, or 70.0 vol % or higher, or may be included in a total amount of, for example, 70.0 vol % or lower, 65.0 vol % or lower, 60.0 vol % or lower, 55.0 vol % or lower, 50.0 vol % or lower, 45.0 vol % or lower, 40.0 vol % or lower, 35.0 vol % or lower, 30.0 vol % or lower, 25.0 vol % or lower, 20.0 vol % or lower, 15.0 vol % or lower, 10.0 vol % or lower, or 5.0 vol % or lower.

The carbonate solvent is well known in the art and are not particularly limited. US 20060154116 and US 20200259215, named above and incorporated by reference herein, describe suitable carbonate solvents.

The carbonate solvent may be, for example, one or more saturated cyclic carbonates, unsaturated cyclic carbonates, linear carbonates, ethers, lactones, tetrahydrothiophene bioxide, or nitriles. More specific examples for the carbonate solvent include ethylene carbonate (EC), propylene carbonate (PC), butylene carbonate (BC), dimethyl carbonate (DMC), diethyl carbonate (DEC), ethyl methyl carbonate (EMC), dipropyl carbonate (DPC), dimethyl ether (DME), 1,2-dimethoxyethane (DME),1,1,2,2-Tetrafluoroethyl-2,2,3,3-Tetrafluoropropylether (TTE), diethyl ether (DEE), and blends of 2, 3, 4, or more thereof.

<Charge Carrier (d2)>

The charge carrier (d2) is a lithium salt and may be, for example, a lithium salt known for use in non-aqueous lithium-ion batteries. In some embodiments, the lithium salt may include one or more of lithium bis(fluorosulfonyl)imide ("LiFSI"), lithium bis(trifluoromethanesulfonyl)imide ("LiTFSI"), $LiBF_4$, lithium bis(oxalato)borate ("LiBOB"), $LiClO_4$, $LiAsF_6$, $LiPF_6$, $LiCF_3SO_3$, $LiAl_4$, lithium 4,5-dicyano-2-(trifluoromethyl)imidazole ("LiTDI"), and the like.

A concentration of the lithium salt concentration in the electrolytic solution may be, for example, more than 0.50 M, more than 0.60 M, more than 0.70 M, more than 0.80 M, more than 0.90 M, more than 1.00 M, more than 1.10 M, more than 1.20 M, more than 1.30 M, more than 1.40 M, more than 1.50 M, more than 1.60 M, more than 1.70 M, more than 1.80 M, more than 1.90 M, or more than 2.00 M, or may be, for example, less than 4.00 M, less than 3.90 M, less than 3.80 M, less than 3.70 M, less than 3.60 M, less than 3.50 M, less than 3.40 M, less than 3.30 M, less than 3.20 M, less than 3.10 M, less than 3.00 M, less than 2.90 M, less than 2.80 M, less than 2.70 M, less than 2.60 M, less than 2.50 M, less than 2.40 M, less than 2.30 M, less than 2.20 M, less than 2.10 M, less than 2.00 M, less than 1.90 M, less than 1.80 M, less than 1.70 M, less than 1.60 M, less than 1.50 M, less than 1.40 M, less than 1.30 M, less than 1.20 M, or less than 1.00 M.

<Additive Compounds (d3)

The additive compounds (d3) include at least one or more compounds known in the art for forming a solid electrolyte interphase (SEI) on the anode active material.

A total weight of the one or more additive compounds may be for example, 0.20 to 6.0 wt % when a total weight of the electrolytic solution is 100 wt %. In some embodiments, a content of the carbonate solvent may be, for example, 10.0 vol % or higher, 15.0 vol % or higher, 20.0 vol % or higher, 25.0 vol % or higher, 30.0 vol % or higher, 35.0 vol % or higher, 40.0 vol % or higher, 45.0 vol % or higher, 50.0 vol % or higher, 55.0 vol % or higher, 60.0 vol % or higher, 65.0 vol % or higher, 70.0 vol % or higher, 75.0 vol % or higher, 80.0 vol % or higher, or 85.0 vol % or higher, and may be, for example, 85.0 vol % or lower, 80.0 vol % or lower, 75.0 vol % or lower, 70.0 vol % or lower, 65.0 vol % or lower, 60.0 vol % or lower, 55.0 vol % or lower, 50.0 vol % or lower, 45.0 vol % or lower, 40.0 vol % or lower, 35.0 vol % or lower, 30.0 vol % or lower, 25.0 vol % or lower, 20.0 vol % or lower, 15.0 vol % or lower, or 10.0 vol % or lower.

The additive compounds may include, for example, one or more known SEI formers/improvers that are reduction-type additives, reaction-type additives, morphology and/or modifiers. In some embodiments, the additive compound may include only one or more reduction-type additives.

The reduction-type additives may be, for example, one or more of vinylene carbonate, vinyl ethylene carbonate, allyl ethyl carbonate, vinyl acetate, divinyl adipate, acrylic acid nitrile, 2-vinyl pyridine, maleic anhydride, methyl cinnamate, vinyl-containing silane-based compounds, vinyl containing siloxanes, acrylic acid nitrile, 2-cyanofurane, $SO_2$, $CS_2$, polysulfide, alkyl sulfites, aryl sulfites, propane sultone, butane sultone, furan derivatives, $N_2O$, alkylnitrates, alkylnitrites, alpha-bromo-gamma-butyrolactone, methylchloroformate, or fluoro-ethylene carbonate.

The reaction-type additives may be, for example, one or more of dialkyl pyrocarbonate, $Li_2CO_3$, phenyl esters, aromatic esters, anhydrides, maleic anhydride, succinimide, aromatic isocyantes, $B_2O_3$, organic borates, trialkylboroxines, trialkoxyboroxines, LiBOB, $LiPO_2F_2$, lithium oxalyldifluoroborate (LiODFB), halogenated compounds, or polydimethylsiloxane.

The morphology modifier may be, for example, one or more of tris(pentafluorophenyl) borane, $NaClO_4$, $Na_2CO_3$, $K_2CO_3$, or crown ethers.

Other additives compounds may also be included in the electrolytic solution.

One type of additive, for example, is a gas-generation agent used for implementing a pressure-type current interrupt device (CID). Example gas-generation agents include cyclohexylbenzene (CHB), biphenyls, and fluorinated biphenyls having an oxidation potential lower than that of the solvent in the electrolyte solution. When the lithium-ion battery reaches an overcharged state, the gas-generation agent reacts to generate gas before the electrolyte solution decomposes. When included, the amount of the gas-generation agent may be, for example, 0.01 wt % to 10 wt %.

Battery Module, Pack, or System

A battery module is a structure containing multiple secondary cells according to the present disclosure arranged side by side in a common casing; a battery pack is a structure containing a plurality of electrically connected battery modules; and a battery system is a structure containing a plurality of electrically connected cells or battery modules. A battery module or pack may contain one or more control systems (e.g., BMS).

It is well known and understood how to electrically connect secondary cells in series and in parallel. Several techniques are disclosed, for example, in U.S. Patent Publication No. 2019/0123315 and U.S. Patent Publication No. 2019/0165584, which are incorporated herein by reference for their description of techniques for assembling a plurality of electrochemical cells and modules. Further, a battery system may comprise additional structure, including a BMS and a cooling system.

State of Charge

It is well known in the art how to determine the state of charge (SOC) of secondary cells based on cell voltage, and battery management systems (BMS) configured to determine SOC based on cell voltage are also well known. Methods of cell monitoring and balancing are also well known in the art. For example, such methods are discussed in U.S. Patent Publication No. 2010/0253277 and U.S. Patent Publication No. 2015/0115736, which are incorporated by reference herein for their description of cell monitoring and balancing, including hardware and programming for accomplishing this function.

Battery modules and/or battery systems of the present disclosure may include a known BMS, which is configured, for example, with known programing (e.g., algorithms) for determining SOC. Alternatively, battery modules and systems of the present disclosure may be configured to be operated and/or monitored by an external BMS.

EXAMPLES

In the following, although embodiments of the present disclosure are described in further detail by means of Examples, the present disclosure is not limited thereto.

Preparation of Graphite Mixtures

Natural graphite A1 was obtained having a particle size D50 of 4 μm and a BET specific surface area of 14 m²/g, and Artificial graphite B1 was obtained having a D50 of ~4 μm and a BET specific surface area of 4 m²/g. The Natural graphite A1 was mixed with the Artificial Graphite B1 to prepare the following 12 mixtures summarized in Table 2.

TABLE 1

| | | |
|---|---|---|
| (graphite used) | | |
| | Natural Graphite A1 | Artificial Graphite A1 |
| Particle size D50 (μm) | ~4 | ~4 |
| Surface area (m²/g) | 14 | 4 |

TABLE 2

| | | | |
|---|---|---|---|
| (graphite mixtures) | | | |
| Mixture Number | Natural Graphite A1 (weight %) | Natural Graphite A2 (weight %) | Specific Surface Area of the Mixture (m²/g) |
| 1 | 100% | 0% | 14 |
| 2 | 95% | 5% | 13.5 |
| 3 | 85% | 15% | 12.5 |
| 4 | 75% | 25% | 11.5 |
| 5 | 65% | 35% | 10.5 |
| 6 | 55% | 45% | 9.5 |
| 7 | 45% | 55% | 8.5 |
| 8 | 35% | 65% | 7.5 |
| 9 | 25% | 75% | 6.5 |
| 10 | 15% | 85% | 5.5 |
| 11 | 5% | 95% | 4.5 |
| 12 | 0% | 100% | 4 |

Example 1

Calendar Life

In Example 1, 6 Ah cylindrical cells were prepared for a calendar life test at 60° C. (100 days). A standard cathode was used for all of the cells under evaluation.

Lithium nickel cobalt aluminum oxide (NCA) was used as the cathode active material, carbon black was used as a conductive additive, and PVDF was used as a binder and were mixed with a solid ratio of 83:12:5 in a solvent of NMP. The mixture was coated on aluminum foil, dried, and calendered to desired thickness to form a final cathode for winding.

The graphite mixtures in Table 2 were used as the only anode active material form forming anodes. Each graphite mixture was mixed with carboxymethylcellulose (CMC) and styrene-butadiene rubber (SBR) emulsion as binders in a solid ratio of 96:3:1. The mixtures were coated on a copper foil, dried, and calendered to a desired thickness to form a final anode for winding.

The loading of the anode active material (N) and the cathode active material (P) were adjusted based on a capacity ratio of N/P=1.1

A cathode, an anode, and a separator were wound into a jelly roll and then inserted into an aluminum can. The dry cell was filled with an electrolytic solution, containing varying amounts of additives SEI-forming additives VC and FEC as noted in FIG. 1, and then sealed. The electrolytic solution contained 50 vol % linear carbonate, 17 vol % cyclic carbonate, and 33% linear ester. The sealed cells were formed at elevated temperature (45° C.) before testing was performed.

A 60° C. calendar life test was performed to test the long term life of the cells. The cells were charged to full charge state (100% SOC), and then stored in an environmental chamber controlled at about 60° C. After about 1 month of storage, the cells were transferred into another environmental chamber which was set at about 25° C. (or about room temperature). The cells were allowed equilibrate to the room temperature conditions, and then were tested to determine the recovery capacity. The capacity retention was the ratio of recovery capacity over the initial capacity. The test was repeated until the end of the cell life, which is defined as 80% of its initial capacity. The results are shown in FIG. 1.

Example 2

Low Temperature Power Test

In Example 2, 6 Ah cylindrical cells were prepared for a low temperature power test at a temperature of about –40° C. The cells were made in the same manner as in Example 1 (except that not all of the same cells were tested). The results are shown in FIG. 2.

Reference Example 1

Long Term Test Results

In Reference Example 1, 6 Ah cylindrical cells were prepared for a long term calendar life test at 60° C. (600 days).

For this Example, three different cells were prepared in the same manner as in Example 1, except for as follows: the first cell used only traditional graphite (which is a natural graphite in nature but a different grade; here the traditional graphite used had a D50 of about 4.5 to 5.5 μm, and a BET surface area of about 10 m²/g) as the anode active material; the second cell used only the Natural Graphite A1 as the anode active material; and the third cell used only the Artificial Graphite A2 as the anode active material. The electrolytic solution for each of the three cells was the same as in Example 1, and 1 wt % VC additive.

The test was performed in the same manner as in Example 1 (except for the length of the test), and the results of this test are shown in FIG. 3.

As shown in FIG. 3, the artificial graphite provided a clear life advantage compared to the natural graphite and a traditional graphite cell.

Example 3

Long Term Test Results

In Example 3, 6 Ah cylindrical cells were prepared for a long term calendar life test at 60° C. (600 days).

For this Example, three different cells were prepared as follows.

The first cell was the same as the traditional graphite cell prepared in the Reference Example (i.e., traditional graphite alone as the anode active material, and same electrolytic solution as in Example 1, with 1 wt % VC additive).

The second cell was prepared in the same manner as in Example 1 corresponding to graphite mixture number 4 (i.e., Natural Graphite A1/Artificial Graphite B1 75/25) and the 0.3 wt % of electrolyte additives (i.e., VC=0.3 wt %, FEC=0.3 wt %).

The third cell was prepared in the same manner as in Example 1 corresponding to graphite mixture number 4 (i.e., Natural Graphite A1/Artificial Graphite B1 75/25) and the 0.6 wt % of electrolyte additives (i.e., VC=0.6 wt %, FEC=0.6 wt %).

Figure 4:
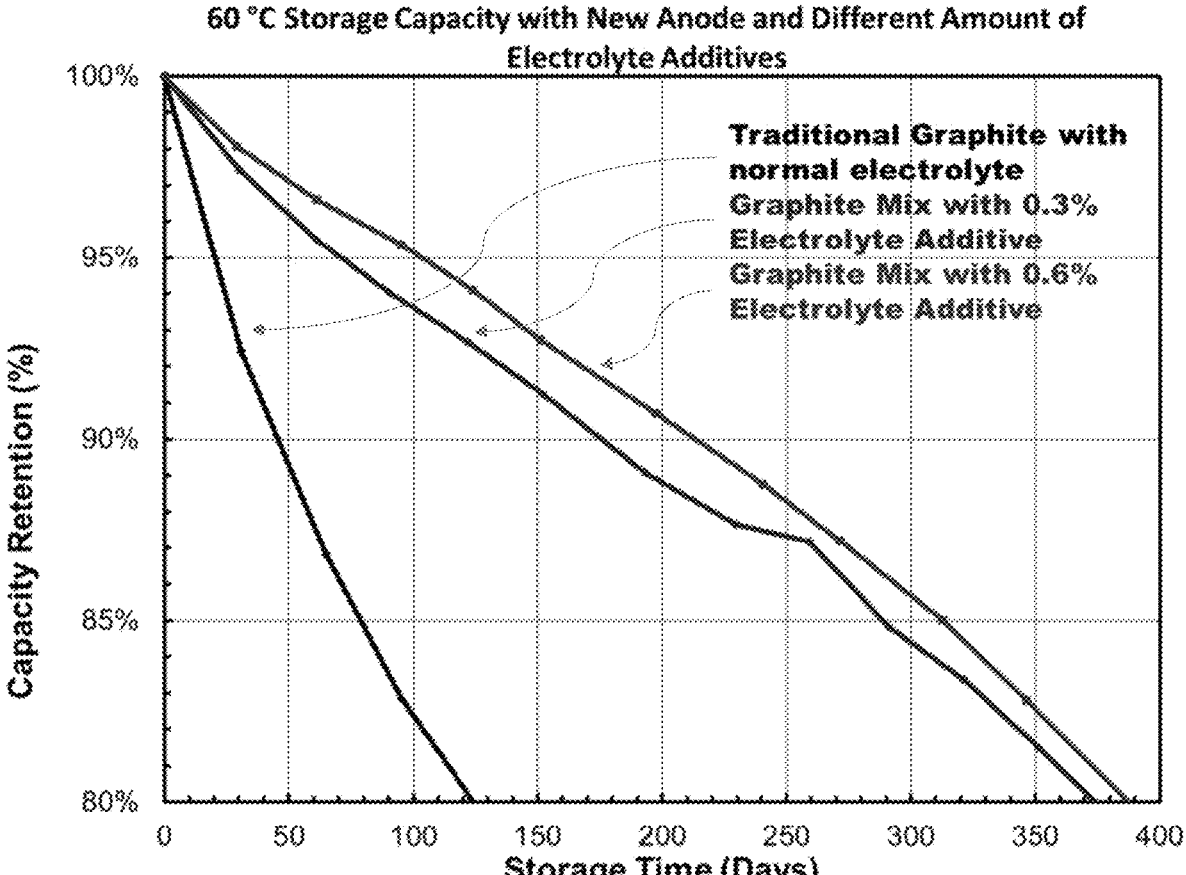
FIG. 4 is a chart showing the results of Example 3, which includes a long term storage capacity test (600 days).

The test was performed in the same manner as in Example 1 (except for the length of the test), and the results of this test are shown in FIG. 4.

As shown in FIG. 4, the cells prepared with the mixture of natural and artificial graphite showed a clear life advantage compared over a traditional graphite cell.

The disclosure is susceptible to various modifications and alternative means, and specific examples thereof are herein described in detail. It should be understood, however, that the disclosure is not to be limited to the particular examples or methods disclosed, but to the contrary, the disclosure is to cover all modifications, equivalents, and alternatives falling within the spirit and scope of the claims.

What is claimed is:

1. A lithium-ion secondary battery, comprising:
an anode including an anode active material;
a cathode including a cathode active material;
a separator disposed between the anode and cathode; and
an electrolytic solution including:
an organic solvent;
a charge carrier; and
one or more additive compounds for forming a solid electrolyte interphase (SEI) on the anode active material,
wherein the anode active material includes 5.0 to 45.0 wt % natural graphite particles and 95.0 to 55.0 wt % artificial graphite particles when a total weight of the anode active material is 100 wt %;
wherein a BET specific surface area of the natural graphite is 10.0 to 20.0 $m^2/g$;
a volume average particle size of the natural graphite particles is 2.0 $\mu m < D50 < 7.0$ $\mu m$;
a volume average particle size of the artificial graphite particles is 2.0 $\mu m < D50 \leq 4.0$ $\mu m$;
the organic solvent includes 5.0 to 95.0 vol % of a linear ester of a $C_2$ to $C_8$ saturated acid when a total volume of the organic solvent is 100 vol %; and
a total weight of the one or more additive compounds is 0.20 to 6.0 wt % when a total weight of the electrolytic solution is 100 wt %.

2. The lithium-ion secondary battery according to claim 1, wherein the one or more additive compounds are selected from the group consisting of vinylene carbonate, vinyl ethylene carbonate, allyl ethyl carbonate, vinyl acetate, divinyl adipate, acrylic acid nitrile, 2-vinyl pyridine, maleic anhydride, methyl cinnamate, phosphonate, vinyl-containing silane-based compounds, vinyl containing siloxanes, acrylic acid nitrile, 2-cyanofurane, $SO_2$, $CS_2$, polysulfide, alkyl sulfites, aryl sulfites, propane sultone, butane sultone, furan derivatives, $N_2O$, alkylnitrates, alkylnitrites, alpha-bromo-gamma-butyrolactone, methylchloroformate, and fluoro-ethylene carbonate.

3. The lithium-ion secondary battery according to claim 1, wherein the one or more additive compounds are selected from the group consisting of dialkyl pyrocarbonate, $Li_2CO_3$, phenyl esters, aromatic esters, anhydrides, maleic anhydride, succinimide, aromatic isocyantes, $B_2O_3$, organic borates, trialkylboroxines, trialkoxyboroxines, LiBOB, $LiPO_2F_2$, lithium oxalyldifluoroborate (LiODFB), halogenated compounds, and polydimethylsiloxane.

4. The lithium-ion secondary battery according to claim 1, wherein the one or more additive compounds are selected from the group consisting of tris(pentafluorophenyl) borane, $NaClO_4$, $Na_2CO_3$, $K_2CO_3$, and crown ethers.

5. The lithium-ion secondary battery according to claim 1, wherein the one or more additive compounds is selected from the group consisting of vinylene carbonate, vinyl ethylene carbonate, allyl ethyl carbonate, vinyl acetate, divinyl adipate, acrylic acid nitrile, 2-vinyl pyridine, maleic anhydride, methyl cinnamate, phosphonate, vinyl-containing silane-based compounds, vinyl containing siloxanes, acrylic acid nitrile, 2-cyanofurane, $SO_2$, $CS_2$, polysulfide, alkyl sulfites, aryl sulfites, propane sultone, butane sultone, furan derivatives, $N_2O$, alkylnitrates, alkylnitrites, alpha-bromo-gamma-butyrolactone, methylchloroformate, and fluoro-ethylene carbonate; and
each additive compound is contained in the electrolyte in an amount of 0.10 to 3.0 wt %.

6. The lithium-ion secondary battery according to claim 1, wherein the one or more additive compounds includes 0.10 to 3.0 wt % vinylene carbonate (VC) and 0.10 to 3.0 wt % fluoroethylene carbonate (FEC).

7. The lithium-ion secondary battery according to claim 1, wherein the organic solvent further includes one or more cyclic carbonate compounds and one or more linear carbonate compounds.

8. The lithium-ion secondary battery according to claim 1, wherein the organic solvent further includes one or more selected from the group consisting of saturated cyclic carbonates, unsaturated cyclic carbonates, linear carbonates, ethers, lactones, tetrahydrothiophene bioxide, and nitriles.

9. The lithium-ion secondary battery according to claim 1, wherein the organic solvent further includes one or more selected from the group consisting of ethylene carbonate (EC), propylene carbonate (PC), butylene carbonate (BC), dimethyl carbonate (DMC), diethyl carbonate (DEC), ethyl methyl carbonate (EMC), dipropyl carbonate (DPC), dimethyl ether (DME), 1,2-dimethoxyethane (DMOE), 1,1,2,2-Tetrafluoroethyl-2,2,3,3-Tetrafluoropropylether (TTE), and diethyl ether (DEE).

10. The lithium-ion secondary battery according to claim 1, wherein the linear ester is selected from the group consisting of ethyl acetate, methyl acetate, propyl acetate, ethyl butyrate, methyl butyrate, propyl butyrate, ethyl propionate, methyl propionate, and propyl propionate.

11. The lithium-ion secondary battery according to claim 1, wherein the cathode active material is represented by one of the following Formulas (A) to (E) or a blend thereof:

$$Li_{1+x}M1_aX_bPO_4 \qquad \text{Formula (A),}$$

wherein, in Formula (A), M1 is at least one selected from the group consisting of Fe, Mn, and Co; X is at least one transition metal selected from the group consisting of Ni, V, Y, Mg, Ca, Ba, Al, Sc, and Nd; $0 \leq x \leq 0.15$; $a > 0$; $b \geq 0$; and optionally $a+b=1$, $$Li_{1+x}Ni_a M2_d M3_e O_2 \qquad \text{Formula (B),}$$

wherein, in Formula (B), M2 is at least one selected from the group consisting of Co, Al, and Mn; M3 is one or more selected from the group consisting of B, Mg, Si, Ca, Ti, V, Cr, Mn, Fe, Cu, Zn, Y, Zr, Nb, W, Mo, Sr, Ce, Ga, and Ta; $0 \leq x \leq 0.15$; $a > 0$; $d > 0$; $e \geq 0$; and optionally $a+d+e=1$, $$Li_{1+x}Mn_2 O_4 \qquad \text{Formula (C),}$$

wherein, in Formula (C), $0 \leq x \leq 0.15$, $$Li_{1+x}CoO_2 \qquad \text{Formula (D),}$$

wherein, in Formula (D), $0 \leq x \leq 0.15$, $$Li_{1+x}V_{1-y}M_y PO_4 F_z \qquad \text{Formula (E),}$$

wherein, in Formula (E), $0 < x \leq 1$; $0 \leq y \leq 0.5$; $0.8 \leq z \leq 1.2$; and M is one or more selected from the group consisting of Ti, Al, Mg, Mn, Fe, Co, Y, Cr, Cu, Ni, and Zr.

12. The lithium-ion secondary battery according to claim 1, wherein a total weight of the artificial graphite and the natural graphite is 75.0 wt % to 100 wt % when a total weight of the anode active material is 100 wt %.

13. The lithium-ion secondary battery according to claim 1, wherein a total weight of the artificial graphite and the natural graphite is 75.0 to 99.0 wt % when a total weight of an anode material layer including the anode active material is 100 wt %.

14. The lithium-ion secondary battery according to claim 13, wherein the one or more additive compounds includes 0.10 to 3.0 wt % vinylene carbonate (VC) and 0.10 to 3.0 wt % fluoroethylene carbonate (FEC);

the organic solvent further includes one or more cyclic carbonate compounds and one or more linear carbonate compounds; and the linear ester is selected from the group consisting of ethyl acetate, methyl acetate, propyl acetate, ethyl butyrate, methyl butyrate, propyl butyrate, ethyl propionate, methyl propionate, and propyl propionate.

15. The lithium-ion secondary battery according to claim 1, wherein a BET specific surface area of the artificial graphite is 1.0 to 8.0 m$^2$/g.

16. The lithium-ion secondary battery according to claim 1, wherein the organic solvent includes 10.0 to 60.0 vol % of a linear ester of a $C_2$ to $C_8$ saturated acid when a total volume of the organic solvent is 100 vol %.

17. The lithium-ion secondary battery according to claim 1, wherein the BET specific surface area of the natural graphite is 12.0 to 20.0 m$^2$/g.

18. The lithium-ion secondary battery according to claim 15, wherein the BET specific surface area of the natural graphite is 12.0 to 20.0 m$^2$/g.

19. The lithium-ion secondary battery according to claim 15, wherein the organic solvent further includes at least 20% by volume of one or more linear carbonates.

20. The lithium-ion secondary battery according to claim 1, wherein the organic solvent consists of:

from 5 to 95% by volume of the linear ester of a $C_2$ to $C_8$ saturated acid; and from 95% to 5% by volume of one or more cyclic carbonates and/or one or more linear carbonates.

* * * * *